United States Patent [19]

Ganoung

[11] Patent Number: 4,505,169

[45] Date of Patent: * Mar. 19, 1985

[54] APPARATUS USING A CONTINUOUSLY VARIABLE TRANSMISSION TO IMPROVE FUEL ECONOMY

[76] Inventor: David P. Ganoung, 4406 Chickasaw Rd., Memphis, Tenn. 38117

[*] Notice: The portion of the term of this patent subsequent to Jul. 28, 1998 has been disclaimed.

[21] Appl. No.: 451,613

[22] Filed: Dec. 20, 1982

Related U.S. Application Data

[63] Continuation-in-part of Ser. No. 205,625, Nov. 10, 1980, Pat. No. 4,383,456, which is a continuation-in-part of Ser. No. 20,916, Mar. 14, 1979, Pat. No. 4,280,469, which is a continuation-in-part of Ser. No. 767,060, Feb. 7, 1977, abandoned, which is a continuation-in-part of Ser. No. 616,640, Sep. 25, 1975, Pat. No. 4,023,641, said Ser. No. 205,625, is a continuation-in-part of Ser. No. 170,017, Jul. 18, 1980, Pat. No. 4,342,298.

[51] Int. Cl.³ .................. B60K 15/00; B60K 20/16
[52] U.S. Cl. .......................... 74/858; 74/866; 74/874; 123/571
[58] Field of Search ............ 74/858, 859, 866, 872, 74/874, 752 D, 645, 871; 123/505, 571, 568

[56] References Cited

U.S. PATENT DOCUMENTS

| | | | |
|---|---|---|---|
| 4,143,631 | 3/1979 | Stumpp | 123/505 |
| 4,228,773 | 10/1980 | Stumpp et al. | 123/505 |
| 4,281,567 | 8/1981 | Maurer | 74/858 |
| 4,387,694 | 6/1983 | Yoshiba et al. | 123/571 |
| 4,437,447 | 3/1984 | Johnson | 123/568 |

OTHER PUBLICATIONS

"Engine-Transmission Relationship for Higher Efficiency", D. F. Caris and R. A. Richardson, Research Laboratories Division GMC, vol. 61, 1953.

"Comparison of CVT Engine Operating Schedules", SAE Technical Paper Series, David Ganoung, Feb. 1983.

*Primary Examiner*—George H. Krizmanich

[57] ABSTRACT

An automotive powertrain includes a basically conventional piston engine, a continuously variable ratio transmission, engine speed and power sensors and a feedback control system. The control system adjusts both the transmission ratio and the throttle valve in the engine carburetor or fuel metering system in response to the position of the accelerator pedal and in response to engine power output and crankshaft speed as measured by the engine sensors. The transmission provides extreme overdrive gear ratios which allow the engine to be operated at wide open throttle even during moderate cruising, and, in addition, the engine carburetor or fuel metering system is calibrated to deliver to the engine a stoichiometric air-fuel mixture which is combined, before combustion, with a special proportion of recirculated exhaust gas. As a result of the control system's implementing extensive wide open throttle engine operation with the above mentioned intake charge composition, many combustion variables are optimized to produce exceptional fuel economy.

20 Claims, 4 Drawing Figures

APPARATUS USING A CONTINUOUSLY VARIABLE TRANSMISSION TO IMPROVE FUEL ECONOMY

CROSS REFERENCE TO RELATED APPLICATIONS

This application is a continuation-in-part of my co-pending application Ser. No. 205,625, filed Nov. 10, 1980 now U.S. Pat. No. 4,383,456 and entitled "Apparatus Using a Continuously Variable Ratio Transmission to Improve Fuel Economy." The above mentioned application Ser. No. 205,625 is in turn a continuation-in-part of my application Ser. No. 20,916, filed Mar. 14, 1979 now issued as U.S. Pat. No. 4,280,469. This U.S. Pat. No. 4,280,469 is a continuation-in-part of my application Ser. No. 767,060 (filed Feb. 7, 1977 and now abandoned), and the above-mentioned application Ser. No. 205,625 is a continuation-in-part of my application Ser. No. 170,017 (filed July 18, 1980), now issued as U.S. Pat. No. 4,342,298. And finally, my abandoned application Ser. No. 767,060 is a continuation-in-part of my application Ser. No. 616,640, filed Sept. 25, 1975 and now issued as U.S. Pat. No. 4,023,641.

BACKGROUND OF THE INVENTION

1. Field of the Invention

This invention relates to internal combustion engines, and more particularly, to the fuel economy of internal combustion engines.

2. Description of the Prior Art

The recent emphasis on energy conservation has spawned interest in automotive transmissions. The prior art does recognize that an automative transmission can influence engine efficiency, and that this influence can be more important than the efficiency of the transmission itself. This is especially true in the case of a continuously variable ratio transmission, and the idea of using such a transmission to improve the operating efficiency of an associated engine is not new.

As an illustration, a given power level, say 15 h.p., can usually be produced throughout a broad range of crankshaft speed by adjusting the engine throttle to appropriately regulate the torque developed. However, peak efficiency for any particular power level will usually occur at only one distinct crankshaft speed. So if a fixed power level, 15 h.p. in this example, is required for 55 m.p.h. cruising or for climbing a hill at 30 m.p.h., or for any of the infinitely many speeds in between, then a continuous range of gear ratios must be available to permit the 15 h.p. to always be produced at the single most efficient crankshaft speed. This principle has been recognized.

What has not been recognized is that the design and calibration of the conventional automotive engine in large measure preclude really efficient operation. So while the prior art includes using a continuously variable ratio transmission to optimize the operation of the conventional automotive engine design, the inefficiency inherent in this design greatly limits the results. The relatively rich calibration of the conventional carburetor at w.o.t. (wide open throttle) best exemplifies this contradiction.

Using a conventional transmission, w.o.t. engine operation is not normally available for cruising, but rather is usually used only when maximum vehicle speed or acceleration is needed. Since a rich air-fuel ratio at w.o.t. does provide maximum engine torque, and thus maximum power at any particular crankshaft speed, the conventional carburetor calibration is in fact entirely appropriate when used in conjunction with a conventional automotive transmission. On the other hand, w.o.t. can be consistently available for even moderate cruising if a continuously variable ratio transmission is used. Since the extra power of a rich air-fuel ratio is gained at the expense of efficiency and is not needed for cruising, conventional carburetor calibration is entirely inappropriate for a continuously variable ratio transmission powertrain oriented toward fuel economy. Nevertheless, the great majority of prior art research and development work with the continuously variable ratio transmission automotive powertrain includes the use of w.o.t. air-fuel ratio enrichment, and this is but one example of the way in which the prior art has failed to consider the interrelationships of powertrain components. In the prior art related to continuously variable ratio transmission powertrains, emphasis has been on the transmission, but the engine is of at least equal importance.

In conclusion, the relatively high efficiency of the Otto thermodynamic cycle has been acknowledged. However, the idea that combustion variables can be optimized in the conventional Otto cycle automotive engine, and that a continuously variable ratio transmission is but one of the requirements for this optimization, is not within the prior art.

SUMMARY OF THE INVENTION

In light of the above, it is therefore a principal object of this invention to present apparatus for optimizing combustion in the spark ignition Otto cycle engine.

It is also an object of the invention to present a powertrain for significantly improving the fuel economy of conventional automobiles.

It is further an object of the invention to present an automotive powertrain which allows wide open throttle engine operation over a wide range of driving conditions, including moderate steady-state cruising on level ground.

It is yet another object of the invention to present an automotive powertrain which emits acceptable levels of nitrogen oxides emissions.

These, and other objects, features, and advantages, will become apparent to those skilled in the art from the following detailed description when read in conjunction with the appended claims and the accompanying drawing.

In accordance with the invention in its broad aspect, apparatus for optimizing combustion in an Otto cycle engine is presented. The apparatus includes a continuously variable ratio transmission, a device for operator control and a specially calibrated engine fuel metering system which incorporates exhaust gas recirculation. Toward the goal of maximizing efficiency, the operator control device facilitates wide open throttle engine operation throughout a wide power range of the engine. To further increase efficiency, and also to reduce nitrogen oxides exhaust emissions, the fuel metering system provides at wide open throttle a stoichiometric air-fuel mixture intermixed with recirculated exhaust gas in a proportion which substantially minimizes the brake specific fuel consumption of the engine.

BRIEF DESCRIPTION OF THE DRAWING

The invention is illustrated in the accompanying drawing, in which.

In the figures of the drawing, like reference numerals are used to denote like parts.

DESCRIPTION OF THE PREFERRED EMBODIMENT

Figure 1:
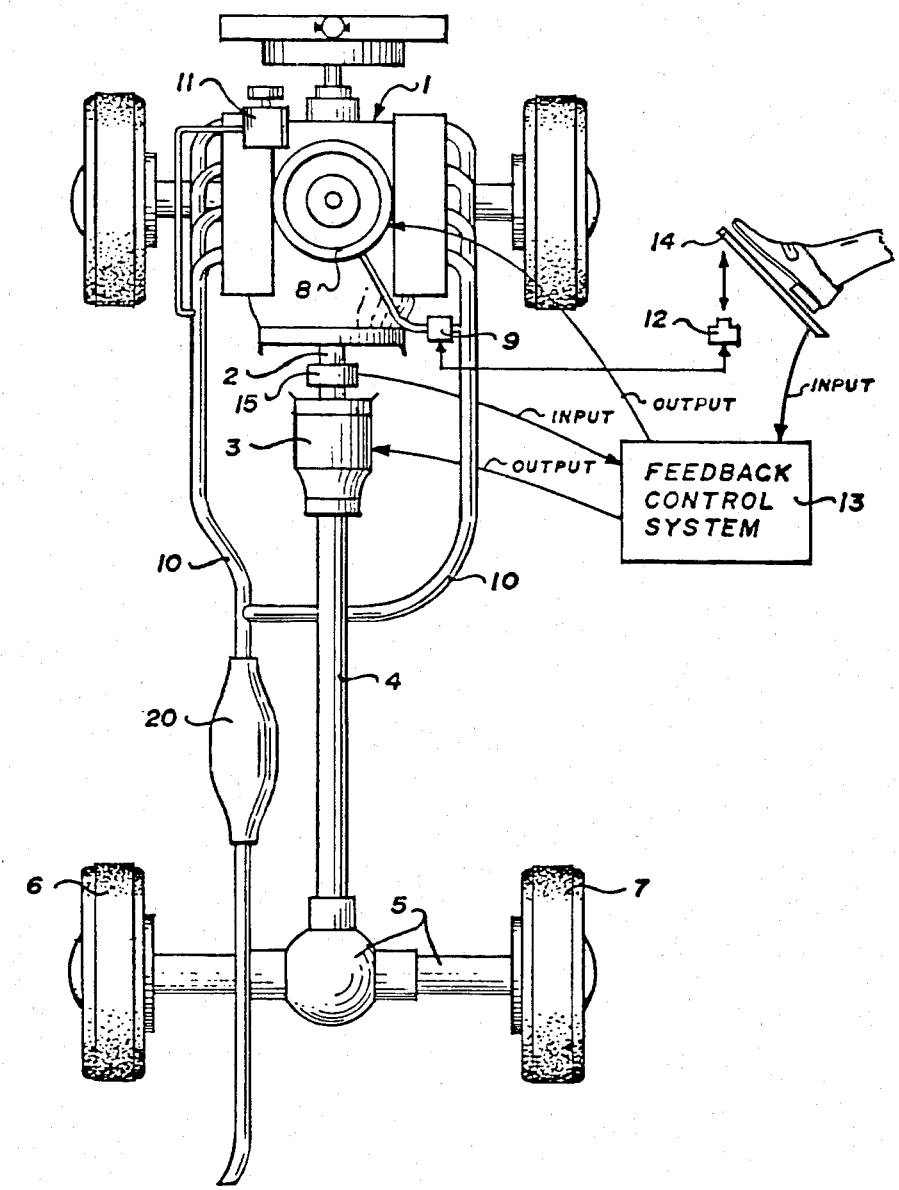
FIG. 1 is a diagram of an automotive powertrain in accordance with a preferred embodiment of the invention.

FIG. 1 shows how a preferred embodiment of an automotive powertrain would be constructed in accordance with the present invention. In FIG. 1, the crankshaft of a basically conventional homogeneous charge piston engine 1 directly drives the input shaft 2 of a continuously variable ratio transmission 3. The transmission 3 may be any of the type having a wide range of ratios, about 6 to 1 or even significantly greater, and having reasonably high efficiency throughout its operating range of ratios and of input and output torque. The output shaft of the transmission 3 drives the propeller shaft 4 of the powertrain through a universal joint (not shown), and the propeller shaft 4 in turn drives the input of a conventional geared differential and drive axle assembly 5 through another universal joint (not shown). Finally, the differential assembly 5 drives the rear tires 6 and 7 which propel an associated automobile.

The gear ratio of the differential 5, in conjunction with the diameter of the tires 6 and 7 and the lower numerical gear ratios of the transmission 3, is such that essentially the maximum operating torque capability of the engine 1 can be absorbed just in maintaining normal level road cruising of the automobile. The middle and higher numerical ratios of the transmission 3 can then provide extra driving torque to the tires 6 and 7 for vehicle acceleration, hillclimbing and the like.

Also part of the preferred embodiment is the feedback control system, generally indicated by the block 13 and described in detail later. This control system 13 has a main input controllable by the vehicle operator through an accelerator pedal 14 and another main input from a device 15 which senses the crankshaft speed of the engine 1. The control system 13 additionally has outputs to control the ratio of the transmission 3 and to control the engine throttle valve, which is interposed in the flow of intake charge admitted to the cylinders of the engine 1 for combustion. The throttle valve is located in the fuel metering system 8 of the engine 1.

With the exception of the geared differential 5, the preferred embodiment so far described herein is nearly identical to that disclosed in my U.S. Pat. No. 4,023,641, in which differential action is achieved with twin hydraulic drive motors rather than with a conventional geared differential. The preferred embodiment of the present invention, however, includes additional components and refinements. First, an EGR (exhaust gas recirculation) valve 9 controls flow of exhaust gas from the engine exhaust system 10 to the fuel metering system 8. Second, the exhaust system 10 delivers the engine exhaust gas to an oxidizing catalytic converter 20, and an engine-driven air pump 11 injects air into the exhaust gas effectively downstream of the EGR pickup, but upstream of the converter 20. Third, the fuel metering system 8 is calibrated to produce an essentially stoichiometric fuel-air mixture. Also, when the EGR valve 9 is open, the fuel metering system 8 intermixes inert exhaust gas with the stoichiometric air-fuel mixture in a special proportion, to be discussed, and this intermixture is then delivered to the cylinders of the engine 1 for combustion. And finally, the control system 13 now accomodates engine speed errors arising from a limited overdrive ratio range in the transmission 3.

In operation, the feedback control system 13 adjusts the ratio of the transmission 3 and the opening of the fuel metering system 8 throttle valve in response to the operator command through depression of the pedal 14 and in response to engine speed as monitored by the sensor 15. This action of the control system 13 is basically similar to that described for the feedback control system of the preferred embodiment in my U.S. Pat. No. 4,023,641.

In review of the description in U.S. Pat. No. 4,023,641, the engine 1 employs design features, especially of the camshaft and induction system, enabling a broad w.o.t. (wide open throttle, referring to the throttle in the fuel metering system 8) torque curve. In other words, any desired power within the wide and continuous range corresponding to this broad torque curve can be developed by the engine 1 simply if the throttle in the fuel metering system 8 is fully opened and if the ratio of the transmission 3 is adjusted to limit the crankshaft speed of the engine 1 to the appropriate value. The control system 13 is, in fact, constructed to hold the throttle in the engine fuel metering system 8 wide open when practical operating speeds of the engine 1 and available ratios of the transmission 3 permit. If the engine 1 is properly designed for extensive w.o.t. operation, this range where w.o.t. operation is desirable will extend from somewhat above idle speed to nearly the crankshaft speed where the engine 1 develops maximum power. The ratio the maximum power developed in this range to the minimum will then be about 5 to 1 or even greater, allowing, in conjunction with the wide range of ratios of the transmission 3, w.o.t. operation of the engine 1 over the majority of driving conditions, including inclination of the roadway and vehicle speed.

Figure 2:
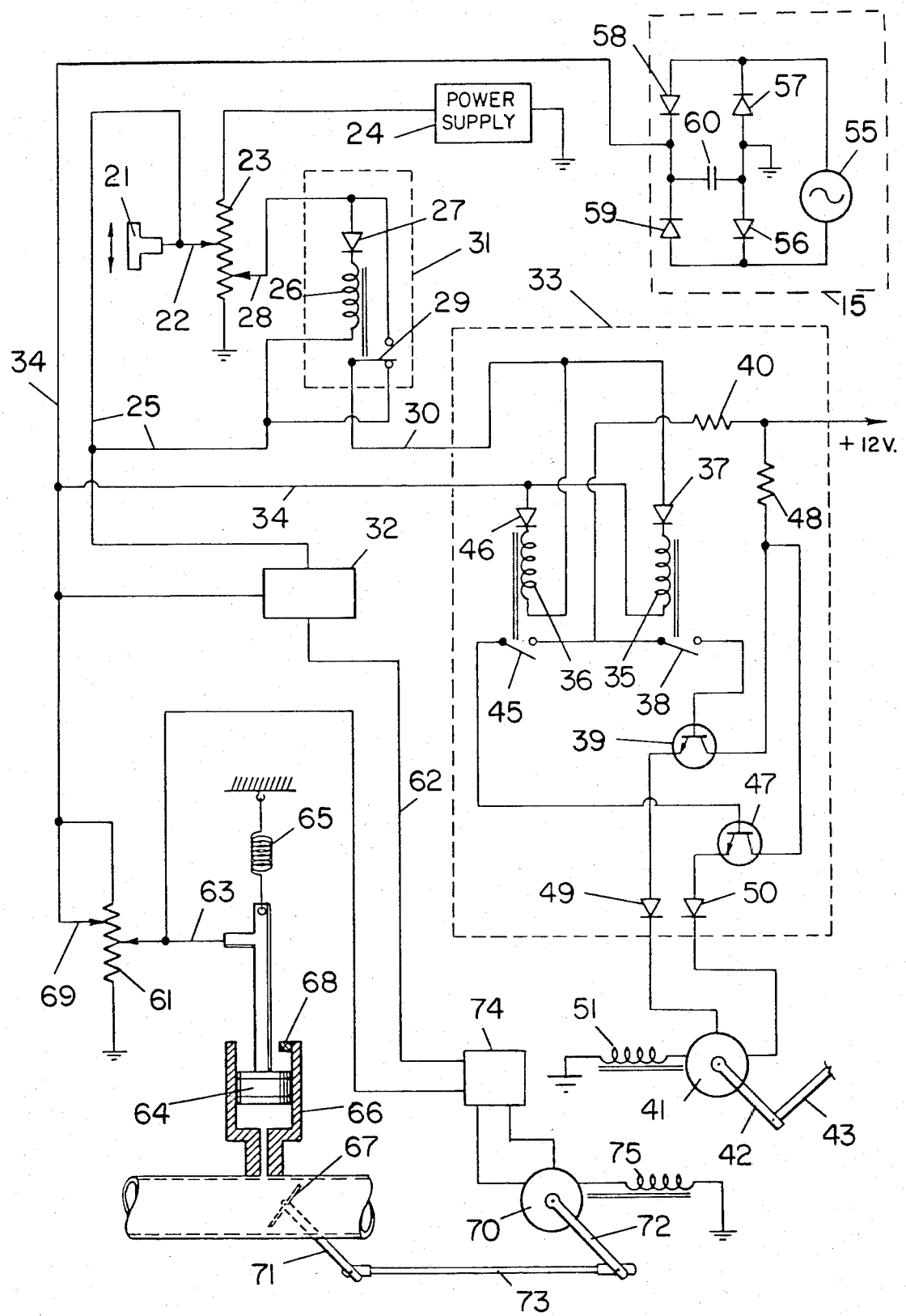
FIG. 2 is an electrical and mechanical schematic diagram of the feedback control system employed in the powertrain of FIG. 1.

FIG. 2 shows one method of construction for the control system 13. First, the accelerator pedal 14 in FIG. 1 is mechanically connected to move an electrically insulating input element 21 upward in FIG. 2 as the pedal 14 is depressed. The input element 21 moves only vertically in FIG. 2 to slide an attached electrical contact 22 along an exposed resistor element 23, with which the contact 22 thereby forms a potentiometer. Progressive depression of the accelerator pedal 14 causes the voltage on contact 22 to progressively increase from ground potential to about 300 volts above ground because a power supply 24 is connected to apply a constant D.C. potential of about 300 volts to the uppermost end of resistor 23, while the lower end of resistor 23 is grounded. The power supply 24 may derive its input energy from an existing vehicle storage battery (not shown) or from any other convenient source.

A branched conductor 25 carries the master command voltage signal from contact 22 to an electromagnetic coil 26, which is connected through a rectifier 27 to an auxiliary sliding contact 28 on the resistor 23. For the positions of the contacts 22 and 28 shown in FIG. 2, contact 22 will of course have a higher potential than contact 28, thereby reverse biasing rectifier 27 to prevent any current through coil 26. As a result, the force of an integral spring (not shown) will keep the double-throw switch 29 in the position shown and the command signal will be passed from conductor 25 to a conductor 30. In the event that the potential of auxiliary contact 28 exceeds that of contact 22, current will pass through rectifier 27 and coil 26 to electromagnetically pull switch 29 into the position connecting auxiliary contact 28 to conductor 30. In other words, the components within the dashed rectangle identified by reference numeral 31 act as a selector circuit connecting conductor 30 to receive the higher of the potentials on contacts 22 and 28. If the polarity of the rectifier 27 were reversed, this selector circuit 31 would select the lower of the potentials on contacts 22 and 28. The circuit 32 is such a low voltage selecting circuit, but its function will be considered later.

Conductor 30 delivers the resulting engine speed command signal to an error correction circuit, the components of which are enclosed within the dashed rectangle identified by reference numeral 33, and a branched conductor 34 brings an engine speed feedback signal to the error correction circuit 33 from the speed sensor 15, to be described in detail later. As will become evident, the engine speed feedback potential on conductor 34 is substantially in direct proportion to the operating speed of the engine 1.

Within the correction circuit 33, current can pass between conductors 30 and 34 through one of two electromagnetic coils 35 and 36, depending on whether the engine speed command signal or the engine speed feedback signal has greater potential. Rectifier 37 connects coil 35 across conductors 30 and 34 with a polarity such that coil 35 will electromagnetically overcome an integral spring force to close an associated switch 38 when the command potential on conductor 30 exceeds the feedback potential on conductor 34 by more than a volt or two. In this case where the command signal exceeds the feedback signal, switch 38 will foward bias the base terminal of the connected power transistor 39 through the resistor 40. Transistor 39 in turn powers a winding in gear reduction motor 41 which responds by rotating an attached torque arm 42 in the downshift direction, to increase the numeral ratio of the continuously variable transmission 3. Link 43 completes the connection between the motor 41 and associated transmission 3. Of course an increase in numerical transmission ratio will tend to increase the operating speed of the engine 1 and thereby equalize the voltage signals on conductors 30 and 34.

The upshift coil 36, switch 45, rectifier 46 and transistor 47 are similarly active to decrease transmission ratio by powering a reverse-rotation upshift winding in motor 41 when the feedback potential on conductor 34 exceeds the command potential on conductor 30. Although not shown in FIG. 2, position switches may be used to open-circuit the appropriate one of the coils 35 and 36 when the torque arm 42 occupies the extreme positions of minimum and maximum transmission ratio. The single resistor 40 limits the base current from an existing 12 volt vehicle storage battery or other source (neither shown) to both power transistors 39 and 47 because both transistors cannot be active simultaneously. For this same reason, only the single resistor 48 limits current to both windings in motor 41, and rectifiers 49 and 50 prevent the power transistors from being damaged by reverse voltage generated in the inactive motor windings. Finally, collector current through either of the power transistors 39 and 47 must pass through an electromagnet 51 before reaching ground. This electromagnet 51 releases a brake within the motor 41 so that application of the brake greatly reduces overshoot as well as helping maintain a fixed transmission ratio when the motor 41 is not energized.

Although the switches 38 and 45 are shown for clarity in FIG. 2 as being distinct from the cores of the coils 35 and 36, electromagnetic reed switches are in fact preferred to conventional relays. With mercury-wetted contacts, reed switches have a very long lifetime, and the coils 35 and 36 may have high resistance values which reduce the effect the contacts 22 and 28 have on the voltage distribution along the resistor 23.

If a variable correction rate is desired, a second correction circuit identical in operating principle to the circuit 33 can be added. The additional circuit would power high speed windings in the motor 41, but have a reduced sensitivity to the voltage difference between the conductors 30 and 34. The arrangement of FIG. 2 is preferred for its simplicity and reliability.

The engine speed feedback signal originates in a small A.C. generator 55 driven in direct proportion to the operating speed of the engine 1. For instance, the generator 55 may often be conveniently located in the ignition distributor of the engine 1, where the distributor shaft would drive the generator 55 at one-half of crankshaft speed. Rectifiers 56, 57, 58 and 59 comprise a full-wave bridge circuit for rectifying the current passing from generator 55 to conductor 34, and a filter capacitor 60 reduces ripple in the feedback voltage on conductor 34.

The branched conductor 34 delivers the engine speed feedback signal to a resistor 61 as well as to the engine speed correction circuit 33 just considered. Resistor 61 has a total resistance value which loads the generator 55 to cause maximum depression of the accelerator pedal 14 to command the operating speed at which the engine 1 develops maximum power. Or equivalently, the constant voltage delivered to resistor 23 by the power supply 24 equals the engine speed signal on conductor 34 when the engine 1 reaches its maximum power speed. Generator 55 should be designed to provide a voltage signal on conductor 34 in direct proportion to the operating speed of the engine 1.

Just as the master command signal entered a first selector circuit 31 to emerge as the engine speed command signal, the same master signal on conductor 25 enters a second selector circuit 32 to become the engine power command signal. The selector circuit 32 connects a conductor 62 to receive the lower of the potentials on the conductors 25 and 34. A method for constructing the selector 32 has already been explained with reference to the first selector circuit 31. In all but a few transient situations, the selector 32 will connect conductor 62 to receive the potential on sliding contact 22.

An engine power feedback signal is derived from resistor 61 by a sliding contact 63 which touches the exposed element of resistor 61 and is moved vertically along the resistor 61 by an attached piston 64. A tension pring 65 pulls upward on the piston 64, and the intake manifold vacuum of the engine 1 is present in a cylinder 66 to which piston 64 is fitted. Since the upper face of piston 64 experiences atmospheric pressure, increasing values of engine intake manifold vacuum on the lower face of piston 64 stretch spring 65 to reduce the resistance between ground and contact 63. The resistance value of this portion of the resistor 61 located between its ground connection and the contact 63 is in the same proportion to the total resistance of resistor 61 as the existing brake torque output of the associated engine is to the maximum torque output of the engine. Consequently, the voltage on contact 63 approximates a signal in direct proportion to the power output of the engine 1. If resistor 61 has a carbon strip element, then the width of the strip may be varied to effect the desired calibration. In the case of a wire wound resistor, the coils of the resistor may be wound on a form of appropriately varying circumference.

In more detail, the calibration of resistor 61 is accomplished as follows. First, the maximum brake torque of the engine 1 is measured on a stationary dynamometer under conditions of normal engine operating temperature and the extreme open position of the throttle valve 67 which controls air flow through the fuel metering system 8 to the engine 1. This measurement requires that the engine operating speed be varied at the extreme open throttle position to locate the maximum torque, and resistor 61 is then positioned to locate the contact 63 just at the uppermost end of the element in the resistor 61. A position limiter 68 should also be adjusted at this time to prevent further upward movement of piston 64, but the limiter 68 must not interfere with the free movement of piston 64 while the engine speed of maximum torque is being located.

The next step using the engine dynamometer includes decreasing engine operating speed by a small percentage of the difference between a slightly slow engine idling speed and the maximum torque speed just determined in the first step. At this new speed, the throttle valve 67 is closed from the wide open position until brake torque drops, from the maximum torque value first determined, by the same small percentage just applied to the specified engine speed difference. The resistance value of the portion of resistor 61 now remaining between contact 63 and the ground connection of resistor 61 should be in the same proportion to the total resistance of resistor 61 as the existing brake torque is to the maximum brake torque first determined. Finally, larger and larger percentage values are chosen to repeat this procedure until the slightly slow engine idle speed is reached, but resistor 61 should include a zero resistance segment to avoid an open circuit at contact 63 in the event vacuum in the cylinder 66 exceeds the normal value for engine idle conditions. A conventional adjustable idle stop (not shown) locates the idle position of throttle valve 67 to restore normal idle speed.

A few additional considerations influence the calibration of resistor 61 as just explained. First, any vacuum spark advance ports located in the throttle bore adjacent the throttle plate 67 should be eliminated, before calibrating the resistor 61, in favor of a transfer slot such as commonly used in the idle system of a conventional carburetor. The much more gradually increasing vacuum signal from the transfer slot will help insure that the intake manifold vacuum is higher at idle than under any slightly loaded off-idle condition. Without this insurance, the engine 1 might not always return to the normal idle speed upon deceleration of the associated vehicle to a stop. Second, all of the foregoing dynamometer testing should include any dilution of the air-fuel charge that is used to improve engine operating efficiency. That is to say the fuel metering system 8 must be calibrated before the resistor 61 can be calibrated. This fuel metering system calibration is explained later with reference to FIG. 3. In addition, the throttle valve 67 follows conventional automotive practice in that the pressure drops associated with the extreme open position of the valve 67, and with any associated fuel metering components such as a venturi, total only a few inches of mercury or less, even when the associated engine is operating at maximum crankshaft speed. Although only a single throttle plate 67 is shown, the associated engine could of course be controlled by a throttle valve assembly or device with multiple bores and corresponding multiple throttle plates.

Another calibration concerns the resistor 61, and this second calibration should be done only following the calibration procedure just explained. An auxiliary sliding contact 69 shunts the engine speed signal on conductor 34 across a variable amount of the upper portion of resistor 61. As a result, extra throttling becomes available to enhance cold operation of the associated engine. The main components for controlling the position of this auxiliary contact 69 are absent from FIG. 2 because they already exist, for example, in the choke system of a conventional carburetor or the auxiliary air device used with many fuel injection systems. The calibration is accomplished empirically, but in any case, the contact 69 should not short-circuit any portion of the resistor 61 once the associated engine reaches its normal operating temperature range. Actuation of contact 69 does reduce the voltage signal on conductor 34 at a given engine speed, but the resulting limitation on maximum engine speed is by no means undesirable during cold operation. The existing cold enrichment system on the engine 1 may also be used to position contact 28 on resistor 23, to thereby permit fast idle speeds which exceed the minimum engine speed used for wide open throttle operation once the engine is warm.

A second reversible motor 70 opens and closes the throttle valve 67 through torque arms 71 and 72 and their connecting link 73. A second error correction circuit 74 powers the motor 70 in response to potential difference between the conductor 62 and the contact 63. The correction circuit 74 causes the throttle valve 67 to open when the power command signal on conductor 62 exceeds the measured power output signal on contact 63, and to close when the measured feedback signal exceeds the command signal. The method of construction already explained for the engine speed correction circuit 33 also applies to the power correction circuit 74, and an electromagnet 75 may be used to reduce control system overshoot in a manner identical to that already explained for the electromagnet 51.

In operation of the control system 13, the engine speed correction circuit 33 will act to equalize the command and feedback voltages on conductors 25 and 34, respectively, whenever the voltage on main contact 22 exceeds that on auxiliary contact 28. From another viewpoint, each position of the accelerator pedal 14 will command a unique engine speed, provided that the pedal has been depressed far enough to raise contact 22 above contact 28, and continued depression of the pedal will command increasing engine speed. The speed correction circuit 33 causes the ratio setting of the continuously variable transmission 3 to be changed until either the commanded engine speed or an extreme of the available transmission ratio range is reached.

Assuming the commanded engine speed is reached with contact 22 still above contact 28, the second correction circuit 74 will seek an effectively wide open position of the throttle valve 67 because the feedback signal residing at the very top portion of resistor 61 already equals the command signal on conductors 25 and 62. At quite low engine speeds, the contact 63 will reach the top of resistor 61 before the throttle 67 is wide open, but this allows faster response to a sudden command for significantly throttled engine operation. More importantly, the loss in engine efficiency associated with this slight throttling at low speed is usually negligible, especially if fuel injection is used. (The throttle 67 is herein defined to be effectively wide open when the resulting pressure drop and engine efficiency are essentially equal to the wide open throttle values). In addition, the stiffness of the spring 65 can be decreased slightly to guarantee the availability of the actual wide open position of the throttle 67 at low engine speeds.

In contrast to the situation just considered, a limited transmission ratio range can combine with moderate driving conditions to create circumstances where the commanded engine speed cannot be reached. As an illustration of this, downhill driving might allow an existing vehicle cruising speed to be maintained by the power available from wide open throttle (w.o.t.) engine operation at only 800 r.p.m., while the available transmission ratios could not limit engine speed to below 1600 r.p.m. at the same vehicle speed. In this case, the feedback signal on conductor 34 would reach equilibrium at twice the 800 r.p.m. command signal on conductors 25 and 62. Consequently, the throttle 67 will close until contact 63 samples half the feedback voltage on conductor 34, or, until engine torque is reduced to about half the w.o.t. value.

In summary of this last example, the equilibrium engine speed exceeded the commanded value by a factor of 2, but engine power output remained at approximately the commanded value because engine torque output was reduced by this same factor of 2. Thus, the resistor 61, contact 63, piston 64 and spring 65 may be thought of as being a torque sensor. In conjunction with other components, this torque sensor reduces w.o.t. engine torque by the factor equal to the ratio of actual engine speed to commanded engine speed. Until now, the contact 63 and its associated hardware have been viewed in alliance with the engine speed sensor components as being a power sensor. Either view is correct, and a true torque sensor can replace the vacuum actuated arrangement shown to provide an accurate torque signal in spite of there being no consistent relationship between torque and intake manifold vacuum.

To this point, only operation with contact 22 above auxiliary contact 28 has been considered. Without the minimum engine speed signal from contact 28, however, the apparatus of FIG. 2 would institute full throttle engine operation at unacceptably low engine speeds.

As already suggested, engine operating efficiency can be improved both by w.o.t. dilution of the air-fuel charge and with engine design characteristics which provide a flat torque curve. Both of these features also contribute to as little as about 15% of maximum engine power being available at w.o.t. and with the engine running at about 20% of the speed at which it develops its absolute maximum power output. Extensive w.o.t. operation at less that 20% of maximum engine speed typically entails undesirable vibration and even the possibility of engine damage, especially to bearings. In brief, relatively minor changes in engine design, such as using a flywheel with an increased moment of inertia, will often remove the final barriers to practical w.o.t. engine operation at only 20% of the maximum power engine speed.

Contact 28 samples from resistor 23 a voltage which would normally command the minimum practical w.o.t. operating speed, or, usually about 20% of the maximum power engine speed. The selector circuit 31 then introduces an intentional error in commanded engine speed (as compared with the value which would force w.o.t. operation) whenever the commanded value on contact 22 is less than the minimum value practical for w.o.t. operation. As already explained with reference to downhill driving and limited transmission ratios, the effect of an engine speed error is to initiate throttling, but without introducing significant error between the actual and the commanded power output. In this way, throttling plays a major part in establishing engine power levels less than about 15% of the maximum. On the other hand, throttling is not used when both more than 15% of power is commanded and the transmission 3 is able to limit engine speed to the commanded value.

Driveability considerations, as well as cold engine temperatures, can have an influence on the minimum engine speed commanded by contact 28. For instance, if higher vehicle speeds are found to be incompatible with the normal minimum w.o.t. engine speed, then the contact 28 can be moved upward as a function of increasing vehicle speed. In addition, intentional engine speed errors can be introduced at other points in the apparatus of FIG. 2 as a function of driveability parameters continually being monitored by sensors.

Below the normal range of engine temperatures, full throttle engine operation might often be impractical. During cold engine operation, therefore, movement of the contact 69 down resistor 61 allows the voltage signals on conductors 34 and 62 to be equalized well before the throttle 67 reaches its wide open position. If, however, the accelerator pedal is suddenly depressed, the voltage on contact 22 will temporarily rise above that on contact 69. Without the low voltage selector circuit 32, the voltage on conductor 62 would also rise above the voltage on contact 69, causing the throttle 67 to be momentarily opened past the limiting position dictated by contact 69 during steady-state conditions. The selector circuit 32 thus serves its purpose only during transient conditions when the engine is cold.

Sudden accelerator pedal movements may similarly trigger only temporary changes in the position of the throttle 67 during the period when the correction circuit 33 is seeking the newly commanded engine speed. Such dynamic behavior of the system simply imparts a more responsive feel to the associated accelerator pedal.

Complete effectiveness of contact 69 depends on the power correction circuit 74 being at least as sensitive as the speed correction circuit 33. For example, when the operator command contact 22 is slowly moved down the resistor 23, the speed correction circuit 33 will cause engine speed to be reduced gradually. If the power correction circuit 74 does not detect the small voltage errors driving the speed correction circuit 33, then the throttle 67 will not be closed at all as engine speed decreases. Due to this decreasing engine speed at constant throttle opening, lower manifold vacuum and even effectively wide open throttle operation could be reached with a cold engine. Reduced sensitivity in the speed correction circuit 33, along with relatively fast movement of the throttle 67 by the motor 70, will prevent the occurrence just explained. During warm engine operation, however, the sensitivity of the speed correction circuit 33 would preferably be restored to a level greater than that of the power correction circuit 74, to thereby guard against hunting movements of the throttle 67. Zener diodes placed in series with the rectifiers 37 and 46 (but not shown in FIG. 2) and shunted during warm engine operation would produce the desired variable sensitivity for the speed correction circuit 33.

The throttle 67 must traverse the entire range from idle to w.o.t. during a quite abbreviated portion of the total travel of the accelerator pedal 14. Again, this is because a maximum of only about 15% of engine power is always developed with throttling. As a result of the abbreviated pedal travel, a conventional mechanical throttle linkage with amplified movement would open the throttle 67 to cause an abrupt rise in engine torque at low engine speeds. Since a given small throttle opening establishes much less torque at higher engine speeds, a mechanical linkage will have either low speed abruptness or lack of response at high speed. Because the present control system opens the throttle 67 in response to measured torque, this compromise is totally avoided.

The following examples further illustrate the interaction of the control system 13 with the other powertrain components shown in FIG. 1. First, assume the associated vehicle is cruising at w.o.t. with an established steady-state power level occurring at 1,000 r.p.m. of the engine 1. If the driver suddenly further depresses the pedal 14 to accelerate, the contact 22 in FIG. 2 will slide upward along resistor 23 to pickup a higher voltage corresponding to a higher crankshaft speed of the engine 1, say 3,000 r.p.m. The resulting error signal thus generated in the control system 13 will cause the transmission 3 to downshift rapidly, just as a conventional automatic transmission may on occasion downshift to provide greater vehicle acceleration. An example of this downshifting process where the voltage on contact 22 exceeds the feedback voltage on conductor 34 has already been considered, and the much higher power developed at 3,000 r.p.m. will in fact cause the vehicle to accelerate. Immediately after the newly selected engine speed of 3,000 r.p.m. is first reached, the crankshaft speed of the engine 1 will tend to follow the vehicle acceleration and thereby further increase. However, a more moderate rate of upshift (corresponding to the vehicle acceleration rather than to the maximum upshift speed of the motor 41 in FIG. 2) will follow the quick downshift (which does correspond to the maximum downshift speed of the motor 41) to prevent engine speed significantly in excess of the commanded 3,000 r.p.m. When a new steady-state vehicle speed requiring the higher power developed at 3,000 r.p.m. and w.o.t. is reached, no further change in transmission ratio will occur unless acceleration pedal position is again changed or unless changes in vehicle operating conditions, such as hills, are encountered.

The next example illustrates the case where changing vehicle operating conditions, rather than movement of the pedal 14, cause an error signal, or difference between the voltage on the contact 22 and that generated by the speed sensor 15. If the driver maintains a constant position of the pedal 14 as the associated vehicle approaches and climbs a hill, then the vehicle will slow down. Assuming an equilibrium w.o.t. crankshaft speed of 1,000 r.p.m. and a steady-state vehicle speed of 50 m.p.h. before encountering the hill, the engine 1 will initially follow the vehicle deceleration that begins when the hill is first reached. However, this loss in engine speed will be quite small, usually less than 50 r.p.m., before the transmission 3 will begin a downshift that just offsets the deceleration in engine speed.

In this second example, the w.o.t. power developed at 1,000 r.p.m. of the engine 1 provided a steady-state vehicle speed of 50 m.p.h. on level ground. This same amount of power would generate some lower steady-state speed, say 30 m.p.h., while climbing the hill. The vehicle will in fact closely approach 30 m.p.h. if the hill is quite long and the position of the pedal 14 is not changed. In thus going from level ground cruising at 50 m.p.h. to an equilibrium speed of 30 m.p.h. while climbing the hill, the crankshaft speed of the engine 1 will not change significantly, but the numerical ratio of the transmission 3 will increase in inverse proportion to the two vehicle speeds, or by 66.7%.

Most drivers manipulate the accelerator pedal to maintain a nearly constant cruising speed whether traveling on level ground or climbing a hill. This situation illustrates the case where both the driving conditions and the operator input change. Again using the example just given, the higher w.o.t. power developed at, say 2,000 r.p.m., would be required to maintain the original speed of 50 m.p.h. while climbing the hill. Just as in a conventional vehicle, the driver himself acts as a feedback control system and seeks out the new accelerator pedal position that maintains the original speed of 50 m.p.h. In the case of the present invention, that new accelerator position is the one that commands the 2,000 engine r.p.m. required to maintain 50 m.p.h. while climbing the hill. Here, the numerical ratio of the transmission 3 will increase by 100%.

Figure 3:
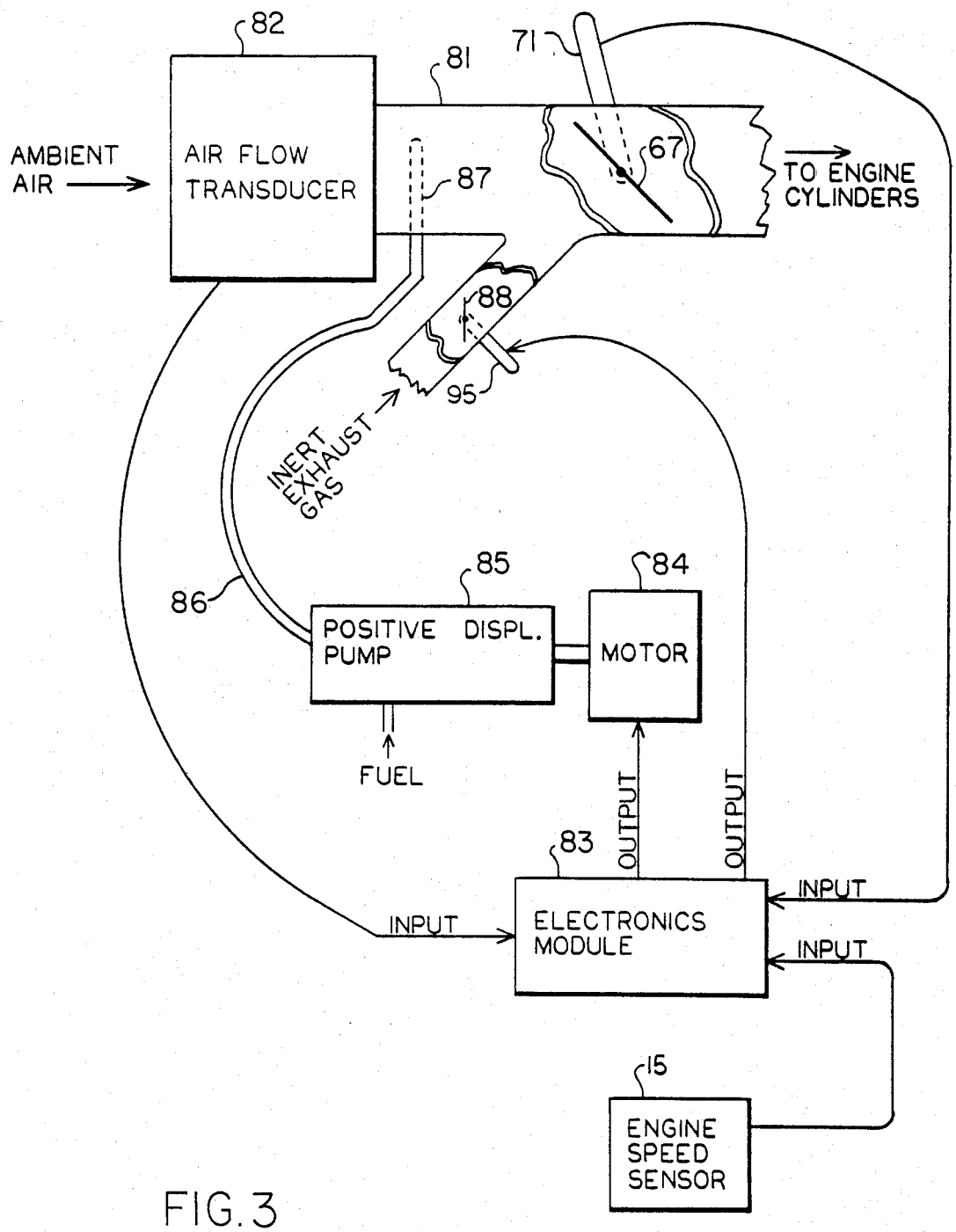
FIG. 3 is a basic diagram of the engine fuel metering system used in the powertrain of FIG. 1.

FIG. 3 shows a basic method of construction for the fuel metering system 8 in FIG. 1. The throttle lever 71 from FIG. 2 rotates the throttle butterfly 67 in the large flow conduit 81, which eventually branches to deliver intake mixture to the individual cylinders of the engine 1. As is typical of modern fuel metering systems, the wide open position of the butterfly 67 allows the engine 1 to induct intake mixture at essentially atmospheric pressure throughout its entire crankshaft operating speed range. At the other end of the conduit 81, an air flow transducer 82 generates an electrical signal which is a function of the mass flow rate of ambient air entering the conduit 81. This mass flow signal from the transducer 82 is applied to the electronics module 83, which powers the electric motor 84 at a speed predetermined to cause the positive displacement fuel pump 85 to deliver a fuel flow that is in stoichiometric proportion to the mass air flow rate measured by the transducer 82. Since the pump 85 is in fact directly driven by the motor 84, it does deliver this stoichiometric fuel flow through fuel line 86 to the fuel rail 87, which atomizes the fuel into the conduit 81 upstream of the throttle butterfly 67. The conduit 81 preferably includes an electrosonic vibrator (not shown) for more thoroughly atomizing the fuel when the butterfly 67 is wide open at low crankshaft speeds of the engine 1.

The fuel metering system electronics module 83 also has an output controlling the position of a butterfly 88 interposed in the EGR flow to the conduit 81. In other words, this butterfly valve 88 and the EGR override valve 9 seen in FIG. 1 are in series, but the valve 9 presents no significant resistance to the EGR flow, except in a special case that will be considered.

The position of the butterfly 88 provides the special proportion of EGR previously mentioned. This proportion is determined through stationary dynamometer testing of an engine identical in design to the naturally-aspirated engine 1. This test engine is first evaluated exclusively at the full open position of the throttle 67 and at crankshaft speeds incrementally increasing from slightly above idle to the maximum power r.p.m. At each crankshaft speed to be investigated, the brake specific fuel consumption (b.s.f.c.) of the test engine is measured as the butterfly 88 is incrementally opened. Of course, the air-fuel constituent of the intake charge remains stoichiometric because the flow transducer 62 measures only air flow, unaffected by EGR rate. Brake specific exhaust emissions are also measured, and the test engine must experience the backpressure of the complete exhaust system to be used in the associated vehicle.

At each investigated speed of the test engine, mbt (minimum for best torque) spark advance is always maintained and a single corresponding position of the butterfly 88 will be found to minimize b.s.f.c. If deviation from this optimum EGR flow rate giving the minimum b.s.f.c. does not substantially increase the b.s.f.c., but at the same time does help bring exhaust emissions within legal limits, then the deviation is obviously justified. (The efficiency of the catalytic converter 20 can often be improved by building it into the exhaust manifold of the engine 1.) However, if meeting legal exhaust emission requirements would require enough deviation from optimum EGR to significantly compromise maximum fuel economy, then a three-way catalyst should instead replace the two-way converter 20 as discussed later. If, on the other hand, nitrogen oxides emission levels much lower than the applicable requirements accompany the very minimum b.s.f.c. scheduling of the EGR butterfly 88, then the electronics module 83 can be recalibrated to provide a slightly lean air-fuel ratio before repeating the w.o.t. dynamometer testing just described. The resulting excess air in the air-fuel charge would further reduce b.s.f.c. as well as carbon monoxide emissions. The finalized schedule of positions of the EGR butterfly 88 as a function of engine speed is stored in a microprocessor memory in the electronics module 83. The existing sensor 15 supplies the required engine speed input to the module 83, and an actuator not specifically shown applies the finalized schedule to the lever 95 attached to the EGR butterfly 88.

The throttle lever 71 provides an additional input to the EGR microprocessor in the module 83. The microprocessor is programmed to use this input for part-throttle EGR control as follows. At fixed crankshaft speed on the stationary dynamometer, the throttle 67 is closed incrementally while maintaining mbt spark advance. At each fixed position of the throttle 67, the setting of the EGR butterfly 88 is again varied in search of minimum b.s.f.c. (for that crankshaft speed and throttle setting). For some of these part-throttle conditions, however, acceptable driveability may become the controlling factor and more compromise to control emissions is acceptable than at w.o.t., especially if the overdrive ratio range of the transmission 3 is wide enough to largely exclude part-throttle operation from level ground cruising conditions of the associated vehicle. Some retard of spark timing is similarly acceptable in consideration of driveability and emissions. This procedure is repeated at various values throughout the crankshaft speed range to thereby generate a look-up table for storage in the EGR microprocessor in module 83. This look-up table of course gives the desired position of the EGR butterfly 88 as a function of the engine speed as provided by sensor 15 and of the position of the throttle 67.

The use of look-up tables for engine control is not uncommon in current passenger cars, and Autotronic Controls Corporation of El Paso, Tex. has developed the hardware in FIG. 3, less the look-up control of EGR, under the name "Electrosonic Fuel Metering System." In addition, the well-known Robert Bosch type "L" multi-point fuel injection system also employs an air-flow transducer to operate on the basic principle explained with reference to FIG. 3. In fact, the Bosch type L system could easily be combined with the microprocessor-controlled EGR system of FIG. 3 to function as the fuel metering system for the present invention. Of note in FIG. 3 are the position of the EGR metering upstream of the throttle 67 and the relatively large size of the EGR butterfly 88 required for high EGR flow at w.o.t. Also, a filter-like mesh element may be used at the EGR entrance in conduit 81 to improve cylinder-to-cylinder EGR distribution.

The high EGR flow rates just specified offer advantages not only in efficiency and exhaust emission levels, but also in driveability and engine durability. Since the specified EGR calibration would reduce w.o.t. brake torque by about 25%, the objective of producing as little as 15% of maximum engine power at w.o.t. can be met at both lower torque and higher crankshaft speed than possible without EGR or other dilution of the stoichiometric air-fuel constituent of the intake charge. The consequent twofold benefit to main bearing life and driveability is fairly obvious to experts in the art, but the reduction in required ratio range in the transmission 3 is not so obvious.

The engine 1 employs a combustion chamber design in which the dependence of burn rate on the expansion velocity component of flame propagation is minimal. (The three main components of the flame propagation rate through the combustion chamber are considered in General Motors Research Labs paper GMR-2884, incorporated herein by way of reference.) Such designs compatible with high EGR rates are already beginning to appear in production passenger car engines, as evidenced by the Datsun twin spark plug NAPS-Z combustion chamber, and S.A.E paper 790386 is incorporated herein by way of reference to describe a fast burn design also now in production. If only a conventional combustion chamber design were used in the engine 1, deterioration in burn rate would nullify much of the efficiency gain afforded by EGR, not to mention driveability and efficiency problems which arise from cyclic dispersion of cylinder pressure.

In final consideration of FIG. 1, the very last increment of depression of the pedal 14 activates the switch 12 which closes the EGR valve 9 to thereby increase the power developed by the engine 1. This feature significantly increases engine torque, but at the expense of reduced engine efficiency. The switch 12 may also activate a spark timing retard and air-fuel ratio enrichment device (not shown) in the fuel metering system 8, to thereby fully maximize torque and prevent autoignition.

The most important advantages of the preferred embodiment described herein result from extensive w.o.t. engine operation wherein many combustion variables in the Otto cycle engine are optimized. For example, engine frictional losses are approximately independent of the torque delivered by an Otto cycle engine, but increase quite drastically with crankshaft speed. Therefore, high combustion pressures, which produce power at relatively high torque values and relatively low crankshaft speeds, reduce the percentage loss to engine friction. However, the very maximum combustion pressure requires maximum combustion temperature, which increases losses to: (1) the cylinder bores, cylinder heads, and other surfaces directly exposed to the combustion gases as they expand against the moving piston, (2) the molecular structure of the combustion gases due to increased dissociation, and (3) the molecular structure of the combustion gases because of the decreasing ratio of the constant pressure to the constant volume specific heat. The net result is that maximum engine efficiency usually occurs at somewhat less than the maximum obtainable combustion temperature. Nevertheless, the best compromise between high temperature and high pressure represents significantly increased efficiency in comparison to the operating conditions required in a conventional powertrain, especially when the throttle butterfly 67 is wide open as discussed below. Additionally, this compromise is fortunate because the somewhat moderated combustion temperatures it produces help reduce the formation of nitrogen oxides.

In further considering the compromise between high combustion pressure to reduce frictional losses versus lower pressure and temperature to reduce the heat losses enumerated, it is evident that combustion pressure can be increased without necessarily increasing combustion temperature. This is true because combustion pressure depends on the density of the combustion gases as well as on their temperature, and thus the optimum compromise occurring at w.o.t. is superior to that occurring with throttling because the density of the combustion gases is maximized at w.o.t. In addition, w.o.t. operation minimizes pumping losses in the engine induction system.

Throttling (a free expansion) of the gaseous portion of the intake charge, before the fuel is added, is herein also considered to be throttling of the intake charge admitted to the engine for combustion. Throttling is so defined herein for convenience and because the negative effects of pumping losses and reduced density of the combustion gases exist regardless of whether throttling takes place before or after the fuel is added. Also, slight throttling purely for the purpose of contributing to the simplicity or accuracy of the engine fuel metering system is not herein considered to be throttling of the intake charge admitted to the engine for combustion. As an illustration, air valve carburetor throats contain a butterfly-like air valve in addition to the throttle valve proper, and this air valve throttles the intake flow very slightly to create a fuel metering pressure differential, without which the carburetor throat would not meter fuel properly. The purpose of this slight throttling is not to vary engine torgue as a method of controlling drive axle torque in response to vehicle operator commands, and therefore, it is not herein considered to be throttling of the intake charge admitted to the engine for combustion. In conventional automotive powertrains, however, the primary function of engine throttling is to control drive axle torque in response to driver commands. In the present invention, drive axle torque is usually controlled by varying the transmission ratio.

An additional consideration is the difference between throttling and restriction of the gaseous portion of the intake charge admitted to the engine for combustion. Since throttling is a free expansion, it necessitates pumping losses. Restriction similarly reduces the density of the intake gases, but pumping losses are not involved. For example, heating of the gaseous portion of the intake charge reduces its density and thus restricts mass flow rate and density of the combustion gases, but it is not throttling because there are no pumping losses. Obviously then, the preferred embodiment of the present invention also has no restriction of the intake charge for the purpose of controlling drive axle torque in response to operator commands. Moderate restriction to implement the operation of a fuel metering system is not herein considered to be restriction of the intake charge, and the definition of restriction of the intake charge herein applies to the gaseous portion of the charge, before and after the fuel is metered into the gaseous portion.

In effect then, unthrottled flow of the intake charge delivered to an engine for combustion is herein defined to mean that free expansion caused reductions in density of the charge, as finally delivered to the engine with the desired constituents in the desired proportions, are quite modest and are not for the purpose of limiting drive axle torque in response to commands from the vehicle operator. Of course, the flow of recirculated exhaust gas may still be throttled because the desired proportion of exhaust gas usually requires throttling of that constituent. The definition of restricted flow is identical except that there is no stipulation as to the cause of reductions in density of the intake charge as finally delivered to the engine.

To this point, it has been established that w.o.t. is the optimum throttle position (and that restriction of the intake charge admitted to the engine should be minimized). Furthermore, with w.o.t. having been obtained, the combustion temperature which provides the highest efficiency (lowest brake specific fuel consumption) should then also be obtained. With the throttle wide open, and assuming mbt spark timing, fixed combustion chamber design, fixed crankshaft speed and the like, the combustion temperature depends only on the amount of fuel consumed per combustion cycle. If the EGR valve 9 is closed, the intake charge will be composed of only air with fuel droplets and fuel vapor suspended therein, and the air-fuel ratio will solely determine the amount of fuel consumed per combustion cycle if other variables do not significantly effect the mass of air inducted per combustion cycle. In this case, where the EGR valve 9 is closed, minimum brake specific fuel consumption will occur at a distinctly leaner than stoichiometric air-fuel ratio, usually of about 22 to 1 by weight for a naturally-aspirated gasoline engine with a fast-burn combustion chamber design such as described in S.A.E. paper 790386. Further enleanment would of course reduce efficiency, but might be desirable because nitrogen oxides emissions are further reduced with reduced combustion temperature. Enleanment pass the point of incipient lean induced misfire (combustion miss) would not be desirable. So an air-fuel ratio near that producing the minimum b.s.f.c. is optimum. This method of extensive w.o.t. engine operation at the optimum lean burn air-fuel ratio as just described, with the EGR valve 9 always closed, is in essence the subject of my U.S. Pat. No. 4,023,641, but it is also instrumental for fully understanding the present invention. One further point is that the excess air in a lean burn air-fuel charge enhances efficiency and reduces carbon monoxide emissions by insuring complete combustion, and the excess air also inherently provides oxygen for oxidation of hydrocarbon emissions in an exhaust reactor or catalytic converter.

To return to the present invention, the control of nitrogen oxides emissions described above and provided by the preferred embodiment disclosed in my U.S. Pat. No. 4,023,641 might not always be sufficient to meet very strict legal requirements, especially for the case of a relatively heavy automobile. Since the fuel metering system 8 of the present invention provides a stoichiometric air-fuel mixture diluted with inert exhaust gas, instead of with oxygen-containing air, the unavailability of oxygen after combustion provides the needed further reduction in nitrogen oxides emissions. On the other hand, the catalytic converter 20 and associated air pump 11 then are usually required for acceptable control of hydrocarbon and carbon monoxide emissions, and some efficiency is lost because there is not excess oxygen in the combustion chamber to insure complete combustion.

Even closer control of nitrogen oxides emissions can be achieved with modification of the present preferred embodiment to allow three-way operation of the catalytic converter 20. Although deletion of the air pump 11 is part of the required modification, the total cost is greater because the air-fuel mixture must be held within a very close tolerance of stoichiometric. This is often done using feedback to the fuel metering system from an oxygen-sensing probe placed in the engine exhaust upstream of the catalytic converter. A catalyst consisting of platinum and about 10% rhodium will function as a three-way catalyst if, and only if, the air-fuel constituent of the intake charge is stoichiometric and the diluting consistuent is inert.

Because of wall-quenching and other mechanisms, complete combustion in the engine is impossible. However, a platinum-rhodium catalyst promotes the full completion of the combustion reactions after the exhaust gas leaves the engine. Thus, hydrocarbon and carbon monoxide emitted from the engine can reduce nitrogen oxides in the presence of the catalyst. If the air-fuel mixture is slightly lean, hydrocarbons and carbon monoxide will be oxidized with free oxygen in preference to oxygen from nitrogen oxides. On the other hand, a slightly rich mixture does not allow complete oxidation of hydrocarbons and carbon monoxide, unless a dual-bed catalyst with air injection is used. In any case, both oxidation and reduction with catalysts are now widely practiced in the automotive industry.

Figure 4:
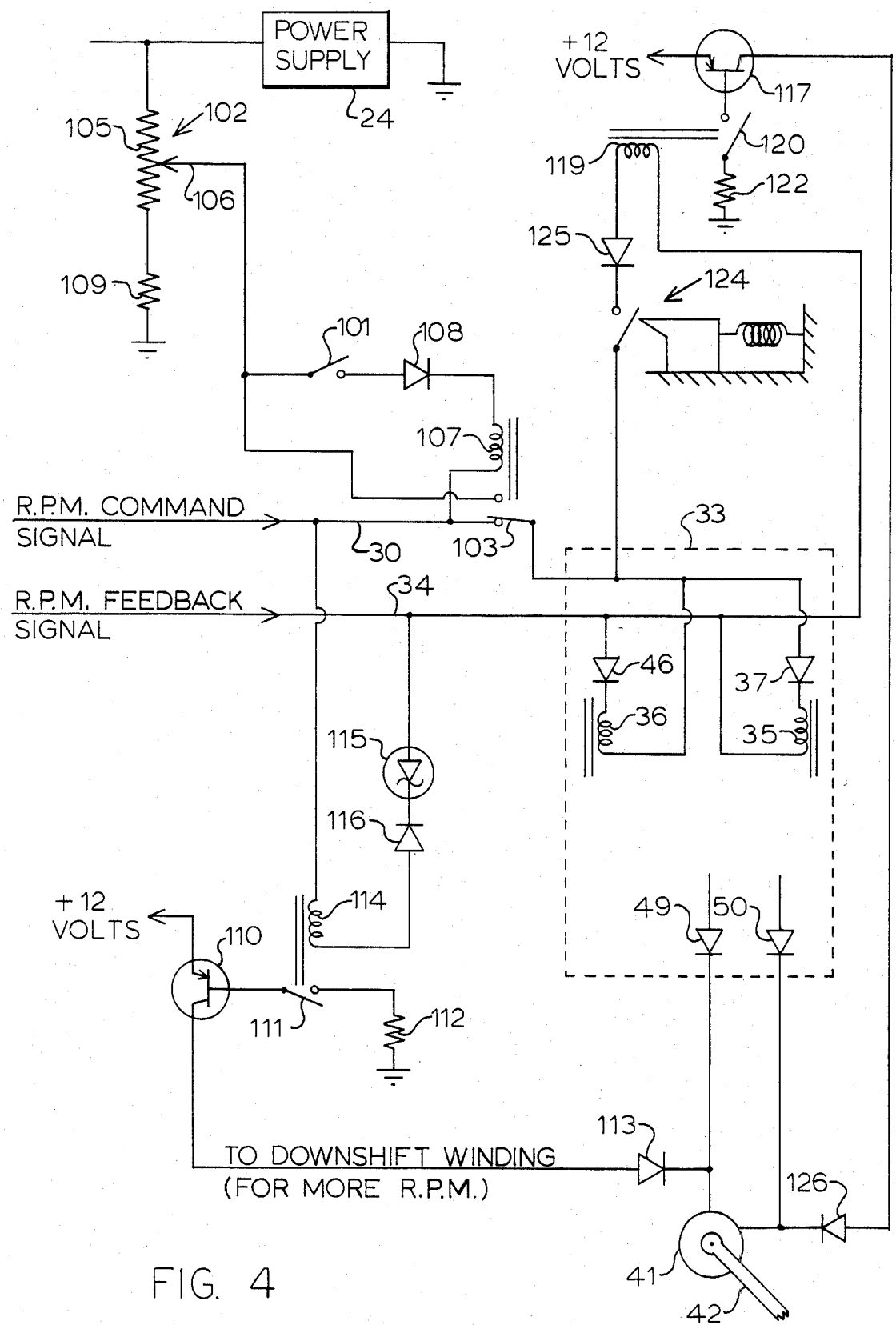
FIG. 4 shows a modification of the feedback control system of FIG. 2.

Returning now to the drawing, FIG. 4 shows how auxiliary components can be added to the control system of FIG. 2 in order to enhance one aspect of driveability of the associated vehicle. Since the engine 1 (in FIG. 1) of the present invention often operates in the neighborhood of 75% of its maximum torque capability, greatly increased power output for sudden acceleration depends to a large extent on quick downshifting of the continuously variable transmission (CVT) 3. Even if the CVT 3 is of a type which can downshift very quickly, the effective moment of inertia of reciprocating and rotating parts in the engine 1 usually becomes the overriding concern. As already mentioned, a relatively heavy flywheel for the engine 1 can contribute to fuel economy by extending the lower power limit of the efficient W.O.T. engine operating range.

That is to say, rapid acceleration of the moving parts of the engine 1 must accompany a quick downshift which occurs at nearly constant speed of the associated vehicle. Especially when the flywheel of the engine 1 has a relatively large moment of inertia, the torque absorbed due to the rapid acceleration of these moving engine parts can easily exceed the steady-state brake torque produced by the engine. A momentary hesitation, or even a sharp braking effect, will then accompany the vehicle operator's sudden demand for more power. As an additional consideration, the more practical types of CVT's now seen to be incapable of really quick rates of downshift. In either case, many drivers would not regard the results as satisfactory.

If, however, the driver can anticipate by several seconds a traffic situation where he might need quick response, then the command signal for crankshaft speed can be temporarily elevated using the activation switch 101 and the RPM selection potentiometer 102, both shown in FIG. 4. As is evident from considering FIGS. 2 and 4 together, the added RPM elevation switch 103 is to be inserted in conductor 30 in FIG. 2 between the dashed rectangles identified by reference numerals 31 and 33. (Reference numerals greater than 100 identify components depicted only in FIG. 4, while components with reference numerals less than 100 are repeated from FIG. 2.)

The resistive element 105 of the RPM selection potentiometer 102 is connected across the power supply 24 so that the associated potentiometer wiper 106 provides an electromagnetic coil 107 with an RPM override signal when the activation switch 101 is manually closed by the vehicle operator. If the RPM override signal on wiper 106 exceeds the nominal RPM command signal on conductor 30, then the RPM elevation switch 103 will disconnect the RPM error correction circuit 33 from the circuit 31 and reconnect the RPM circuit 33 to receive the RPM override potential from wiper 106.

The force of an integral spring holds the RPM elevation switch 103 in the position shown in FIG. 4, and the electromagnetic coil 107 overcomes this spring force when the potential on wiper 106 exceeds that on conductor 30. The connection of coil 107 between wiper 106 and the conductor 30 includes in series a diode rectifier 108, as well as the activation switch 101, to guarantee that wiper 106 will never supply the RPM correction circuit 33 with a command potential less than that on conductor 30. Finally, the fixed-valve resistor 109 limits the minimum potential that may be selected with the wiper 106, and the RPM selection potentiometer 102 may include a calibration display showing, for instance, the percentage of full engine power available at the crankshaft speeds corresponding to various positions of the wiper 106.

In operation of the activation switch 101 and the RPM selection potentiometer 102, the vehicle operator closes switch 101 and selects a position of potentiometer 102 which balances the added noise of extra engine speed against the extra response thereby made available. This action on the part of the operator of course precedes any actual demand for extra power. Consequently, any abrupt and substantial deviation from the normal relationship between engine power output and the position of the wiper 22 (effectively, the position of the accelerator pedal) would likely be quite annoying to the vehicle operator at this time, and possibly even dangerous.

Since the RPM elevation switch 103 does not alter the power command signal received by the power correction circuit 74 (FIG. 2), the throttle actuator 70 will close the throttle 67 an amount that approximately offsets the extra power that would otherwise be developed due to increased crankshaft speed. So the same power level is maintained, but at higher crankshaft speed and at a more closed position of the throttle butterfly 67. Now when the operator does move the wiper 22 abruptly upward by suddenly depressing the accelerator pedal, added power is produced as quickly as the throttle actuator 70 can reopen the butterfly 67, rather than being limited by considerations of engine inertia or by leisurely downshift response.

If the anticipated need for extra power does not materialize, then the operator simply releases switch 101, which is returned to the open position shown in FIG. 4 by the force of an integral spring. At this time, the upshift coil 36 and associated switch 45 in the RPM correction circuit 33 become active to return engine speed to the lower level which corresponds to the command signal on conductor 30. As shown in FIG. 2, the resistor 48 does limit the voltage applied across the CVT ratio actuator 41 during this process of returning engine speed to the nominal value.

The value of the resistor 48 thus determines the rate of downshifting and upshifting caused by the RPM correction circuit 33. This value of resistor 48 is chosen so that the resulting angular acceleration, both positive and negative, of the crankshaft 2 does not objectionably alter its torque output from the steady-state value. Again, this has special significance where a heavy engine flywheel is used.

As previously suggested, added components for more rapid shifting of the CVT 3 may augment the RPM correction circuit 33. For example, the PNP polarity power transistor 110 applies essentially the full source voltage of 12 volts across the downshift winding in the actuator 41 when the switch 111 joins the base terminal of transistor 110 to ground through resistor 112. As a result, the actuator 41 rotates its attached torque arm 42 considerably faster than when the source voltage is applied to the downshift winding of actuator 41 through resistor 48 and NPN power transistor 39.

A diode rectifier 113 connects the "rapid downshift" power transistor 110 to the ratio actuator 41 at the cathode of diode 49, and rapid downshift coil 114 electromagnetically overcomes an integral spring force to close the switch 111 when the RPM command signal on conductor 30 exceeds the RPM feedback signal on conductor 34 by more than a chosen amount. The breakdown voltage of Zener diode 115 determines this chosen amount. The coil 114 and Zener diode 115 are of course connected in series between conductors 30 and 34. In addition, rectifier diode 116 allows the coil 114 to sense the need for only a downshift, because the diode 116 has the appropriate polarity in its connection in series with the coil 114 and Zener diode 115.

The Zener diode 115 helps insure that the CVT ratio actuator 41 will downshift at a moderate rate unless the vehicle operator has made a rather abrupt and exaggerated movement of the accelerator pedal without first using the RPM selection potentiometer 102 and its activation switch 101. The breakdown voltage of the Zener diode 115 is chosen accordingly.

Of special note is the direct connection of one terminal of the coil 114 to the side of the RPM elevation switch 103 which is directly adjacent the circuit 31, rather than the side adjacent the circuit 33. This connection prevents the rapid downshift power transistor 110 from ever energizing the CVT ratio actuator 41 as a result of the use of the RPM selection potentiometer 102 and its activation switch 101. Without this feature, downshifting in anticipation of needed extra power would frequently cause an objectionable negative inertia torque, due to rapid engine acceleration. Since the operator usually closes the activation switch 101 several seconds prior to the actual demand for extra power, there is normally enough time for the smoother, more moderate rate of downshift corresponding to the voltage applied to the ratio actuator 41 being limited by resistor 48.

To complement the rapid downshift feature, a rapid upshift rate is available through another PNP power transistor 117, which has relay components 119 and 120 to provide forward bias to ground through resistor 122 when the RPM feedback signal on conductor 34 exceeds the RPM command signal supplied to the error correction circuit 33 by the switch 103. Such forward biasing of the base-emitter junction of the transistor 117 will often occur during rapid acceleration of the associated vehicle.

During rapid acceleration, the conductive state of transistor 117 will have less tendency to cause an objectionable inertia torque to be applied to the engine crankshaft 2. In fact, sufficiently rapid acceleration of the asociated vehicle will entirely nullify any angular deceleration of the crankshaft that would otherwise be due to the rapid upshift rate instituted by the transistor 117.

During more steady speeds of the associated vehicle, however, activation of the transistor 117 by the relay switch 120 would often cause an objectionable inertia torque to act upon the crankshaft 2, except that the mechanical accelerometer switch assembly 124 opens when vehicle acceleration drops below a predetermined calibration value. Since the accelerometer 124 resides in series with the relay coil 119 and rectifier 125, the transistor 117 will not remain conductive at low, zero or negative values of vehicle acceleration. This series connection of components 119, 124 and 125 of course joins the conductor 34 to the output side of switch 103 as shown. Finally, only the rectifier 126 stands between the collector of transistor 117 and the upshift winding terminal at the cathode of rectifier 50.

Before beginning the empirical calibration of the accelerometer 124, it should be realized that a given rate of rotation of the ratio actuator torque arm 42 will tend to cause an acceleration of the crankshaft 2 in direct proportion to the existing RPM of the crankshaft 2. In addition, the rate of change of transmission ratio may depend on the position of torque arm 42. With these things in mind, the accelerometer 124 should be calibrated to open circuit the relay coil 119 before decending to the highest acceleration value which will ever fail to nullify objectionable inertia torque due to the rapid upshift rate accompanying the conductive state of transistor 117.

That is to say, the conductive state of transistor 117 will obviously cause the ratio torque arm 42 to rotate in the upshift direction at a relatively high rate. At a certain useable combination of RPM of the crankshaft 2 and position of the torque arm 42, this high upshift rate will establish the maximum angular deceleration of the crankshaft 2 for constant vehicle speed. (Since the combination of high RPM and extreme overdrive gear ratios often produces unreasonably high vehicle speeds, maximum angular deceleration will not necessarily occur at maximum RPM.) At this same useable combination of RPM and position of the arm 42, a corresponding threshold value of vehicle acceleration will offset enough of the angular crankshaft deceleration to prevent objectionable inertia torque. Because of the effect of road inclination on a simple mechanical accelerometer, the calibration value of the accelerometer 124 should significantly exceed the above threshold value.

Since the rapid upshift rate afforded by transistor 117 is really needed only when vehicle acceleration is quite pronounced, the calibration of accelerometer 124 can usually accomodate the effects of roadway inclination. If not, an electronic accelerometer can be constructed by using an operational amplifier to modify the RPM feedback signal on conductor 34. The gain-controlling feedback resistor for this operational amplifier would be a rotary potentiometer turned by the ratio actuator 41 and calibrated to produce a voltage output signal in direct proportion to the angular speed of the driveshaft 4.

A simple capacitor circuit can then differentiate the driveshaft speed signal to provide a vehicle acceleration signal unaffected by inclination of the roadway. Moreover, additional components may be used to adjust the differentiated drive shaft speed signal to account for the effects engine RPM and position of the torque arm 42 have on deceleration of the crankshaft 2. As an alternative, the drive shaft speed signal can be supplied by a sensor like the sensor 15, but placed on the driveshaft 4.

Yet another consideration may effect the rapid shift rates afforded by PNP transistors 110 and 117. Some types of CV transmissions, such as variable belt drives, can tolerate a less rapid rate of change of ratio at lower rotational speeds. To compensate for this, components (not shown) can be added to disable transistors 110 and 117 at low RPM of the crankshaft 2. With such compensation, the rapid upshift and downshift rates can sometimes be higher than otherwise possible.

In summary of shift rates, the RPM correction circuit 33 includes resistor 48 to prevent objectionable inertia torques from being applied to the crankshaft 2 when the ratio of the CVT 3 is changed. In many cases then, the actuator 70 will accomplish the rapid adjustments (of the throttle 67) necessary to make power output conform to the commanded value more quickly. In other situations, rapid adjustment of power output via relatively rapid changes in the ratio of the CVT 3 is more acceptable, or possibly the only alternative. In these other situations, one of the PNP power transistors 110 and 117 becomes active to reinforce, or replace entirely, the quick action of the throttle actuator 70.

The vehicle operator can use the RPM selection potentiometer 102 and activation switch 101 for uses in addition to enhanced acceleration response. For example, temporarily elevated engine speed can aid alternator and air conditioner performance, or increase engine braking. To introduce yet another use, the CVT 3 might employ a manual clutch rather than the fluid coupling, infinite range of transmission ratio or other clutching means more commonly used. With a manual clutch, the ratio actuator 41 would have a tendency to upshift away from the greatest torque multiplication ratio if, during clutch engagement, the operator allowed crankshaft speed to rise above the rather low value corresponding to the potential on the auxiliary wiper 28 (which supplies the signal for the minimum practical W.O.T. engine speed). To eliminate this tendency, the operator could simply close the activation switch 101 briefly during clutch engagement.

Still another use for the RPM elevation switch 103 is better accomplished through first modifying the apparatus shown in FIG. 4. To begin, the RPM selection potentiometer 102 and RPM elevation switch 103 should be replaced by an operational amplifier inserted in the conductor 30 and capable of handling voltages up to that of the power supply 24, but having its output voltage limited to that of the supply 24. The feedback resistor for this operational amplifier would be a potentiometer calibrated to provide a minimum gain of one for the operational amplifier.

Next, an autoignition sensor and actuator arrangement of the basic type now commonly used to retard ignition timing on turbocharged passenger cars would instead adjust the gain of the operational amplifier in conductor 30 beyond one if the autoignition threshold of the sensor were reached. In this way, w.o.t. engine operation would automatically be abandoned if low octane fuel were used. Such automatic protection would allow the safe use of a higher compression ratio in the engine 1. Of course, multiple sets of RPM elevation apparatus could be placed in series in conductor 30 to secure all of the features that have been considered.

Although the advantages of extensive w.o.t. engine operation are considerable, the driveability and other features explained with reference to FIG. 4 do not depend on the w.o.t. approach to improved engine performance. In particular, a second potentiometer resistor may be placed in parallel with the resistor 23 across the power supply 24 in FIG. 2. Thus, with two master command potentiometers, the potentiometer wiper 22 would be used to supply only the RPM command signal, and the second, added potentiometer would provide the power command signal. Or, in other words, the circuit 32 would be connected to the wiper of the added potentiometer rather than to the wiper 22. With this simple modification, engine operating schedules other than the extensive w.o.t. schedule can be programmed into the control system of FIGS. 2 and 4.

In more detail, each crankshaft speed on the engine operating schedule will correspond to a position of the throttle plate 67 that is less than effectively wide open, except at the crankshaft speed of maximum power output. In turn, the position of the throttle 67 will correspond to a position of the torque potentiometer wiper 63 that samples a voltage significantly less than that on wiper 22. This lesser power command voltage would exist on the wiper of the added potentiometer simultaneously with the greater RPM command voltage on wiper 22, both wipers being attached to move with the insulating element 21. The real utility of such an arrangement resides not with the gasoline engine, however, but with the Diesel and other unthrottled engines.

In the case of the Diesel engine, optimum efficiency at any particular crankshaft speed amost always occurs at a fuel injection rate which lies distinctly below the maximum available at that crankshaft speed. So while the torque-controlling device, or throttle plate 67, of the engine 1 must be effectively at its extreme open position to secure maximum efficiency, the torque-controlling device for a Diesel engine must be at less than its position of maximum torque to secure maximum efficiency.

A common and well known type of Diesel fuel injection pump utilizes one reciprocating plunger to meter fuel for each engine cylinder. The plunger has a helical land which clears a spill port in the plunger bore to thereby abort a portion of the pumping stroke of the plunger. If the plunger is rotated to a new angular position in its bore, the helical land will of course clear the spill port at a different point in the stroke of the plunger. A gear rack controls the angular position of all plungers in the pump by engaging gear teeth formed around the circumference of each plunger. Such an injector rack is therefore the torque-controlling device for a Diesel engine employing this type of fuel injection pump.

The injector rack of a Diesel engine differs in an important way from the throttle valve 67 of an Otto engine. In the Diesel, a fixed position of the injector rack will regulate engine brake torque output to a value that remains roughly independent of crankshaft speed. Consequently, the wiper 63 of the torque potentiometer can, in the case of the Diesel engine, be attached directly to the injector rack. In contrast, the position of the throttle plate 67 does not directly give a good indication of torque output because, for instance, a partly-open position of the throttle 67 will restrict brake torque much more at high RPM that at low RPM of the engine crankshaft 2.

As already implied, the operating schedule of minimum B.S.F.C. for a Diesel engine can be programmed into the control system of FIGS. 2 and 4 if a second potentiometer is added in parallel with the existing potentiometer resistor 23. Again, the added potentiometer can be calibrated so that the power command signal on its wiper secures, at each and every position of the input element 21, the minimum B.S.F.C. available at the corresponding fixed crankshaft speed commanded by the wiper 22. Driveability or emissions considerations might dictate some variance from this minimum B.S.F.C. schedule.

In summary of FIG. 4, several performance features have been explained. All of these features derive from temporary elevation of engine RPM above the nominal value determined from the engine operating schedule. These features would, at best, be seriously compromised if substantial changes in engine power output accompanied the elevation in engine RPM.

The engine torque-controlling device, or throttle plate 67, could follow a fixed engine operating schedule of its own position versus crankshaft speed, but this approach would do nothing to offset the extra power developed when engine RPM is temporarily and purposely elevated above the nominal value. If, on the other hand, the torque-controlling device is regulated in response to command and feedback values of a variable that increases when engine power output increases, then at least some of the power corresponding to elevated RPM will be offset. Furthermore, the preciseness of this compensation process depends on the preciseness of the measured power signal exemplified by the potential on the wiper 63.

The engine intake manifold activated piston 64 and allied components comprise an engine air and EGR intake flow measuring device that is conveniently calibrated, as explained earlier with reference to the resistor 61, to have a voltage output which approximates engine power output. The stability of this calibration in turn depends on the stability of EGR and other calibrations which, in addition to total intake flow rate, affect engine power output. Since the piston 64 and associated components do not respond to the distinct increase in engine power output caused by the closing of the EGR valve 9 in FIG. 1, they in this respect purely comprise an intake flow measuring device. Nevertheless, this blending of intake flow and power output measuring characteristics is an advantage because it inherently prevents any disturbance of the control system when the EGR valve 9 closes or opens abruptly.

Acceptable operation of the control system of FIGS. 2 and 4 also depends on the previously explained EGR calibration procedures which avoid exaggerated changes in the EGR rate, other than that caused by the on-or-off action of the EGR valve 9. For instance, unacceptable control of EGR rate will cause the engine 1 to develop more power after an actual reduction in total intake flow rate. More specifically, a sharp decrease in EGR could more than offset, in the measurement of total intake flow rate, a substantial increase in the engine's rate of consumption of stoichiometric air-fuel mixture. In this case, the power signal on the wiper 63 would decrease while power output increased.

Of course an actual power measuring device could replace the piston 64 and its allied components, but the cost would also be much higher, unless perhaps a power signal could conveniently be derived from, say, the electrical pulse width for controlling an engine fuel injection system. (Such a pulse width would more closely approximate indicated rather than brake power output.) Essentially, all of the deviation in the signal on wiper 63 from being a perfectly accurate power signal results in displacements of the engine operating point along the engine operating schedule of greatest efficiency, rather than in displacements into less efficient operating areas. This advantage is peculiar to the w.o.t. engine operating schedule.

If the CVT 3 in FIG. 1 has a relatively limited ratio range, then elevated R.P.M. will often occur naturally and thereby make some of the features discussed with reference to FIG. 4 of lesser value. In such a situation, the throttle valve 67 will prevent the variations in power output that would otherwise require bothersome manipulation of the accelerator pedal 14. So a decreased ratio range reduces certain control system advantages of the present invention while at the same time emphasizing an alternative feature. Most importantly though, a wide ratio range benefits fuel economy.

Even though the foregoing description has necessarily been quite specific, it has also included a few variations which help to illustrate that the spirit and scope of the present invention extend well beyond the preferred embodiment. To introduce another control system variation, it should be appreciated that the actual power output from the engine 1 could be determined by using appropriate electronic components to process feedback signals indicating the speed of the crankshaft 2 and the position of the throttle plate 67. This approach could use either algorithms or electronically stored data for generating the power output signal as a function of RPM and throttle angle. The same algorithms or stored data would then be used to determine the angular position of the throttle 67 needed to equalize the actual power output to the desired power output as represented by the command signal on conductor 34. In this particular variation, the throttle actuator would respond to command and feedback values for throttle position, but the entire throttle control apparatus would still be operative to adjust the position of the throttle plate to thereby substantially eliminate the difference between desired power output and actual power output.

What is claimed is:

1. Apparatus for improving the efficiency with which power is delivered to a load by a naturally-aspirated Otto engine controlled by a throttle valve device, the apparatus comprising:

fuel metering means having a wide open throttle calibration for automatically providing dilution of the air-fuel charge supplied to said engine when said throttle valve device is effectively wide open, said wide open throttle calibration extending substantially throughout the range from a minimum operating speed of said engine to the operating speed at which said engine develops maximum power, said minimum engine speed and said maximum power engine speed being boundaries of the majority of the operating speed range wherein said engine delivers power to said load, the major portion by weight of said air-fuel dilution consisting of recirculated exhaust gas, and said air-fuel dilution displacing a least 10% by weight of the fuel in said air-fuel charge as compared to otherwise identical operation of said engine with an undiluted stoichiometric air-fuel charge, said displacement of at least 10% existing substantially throughout said engine operating speed range of said wide open throttle calibration, whereby the combustion temperatures during relatively high torque operation of said engine are lowered, a continuously variable ratio transmission which transfers mechanical power from said engine to said load, said transmission having a range of ratio which allows torque values commonly imposed on said engine through said transmission to balance the brake torque output from said engine when the following conditions exist concurrently: (1) said throttle valve device is effectively wide open, (2) said fuel metering means is operative to provide said dilution of the air-fuel charge and (3) the power necessary to drive said load allows said engine to operate well below said maximum power engine crankshaft speed, whereby said transmission ratio range may often be used in preference to throttling for regulating the engine power output, and control system means for implementing effectively wide open throttle operation of said engine, said control system means comprising: (1) input means for selecting the desired operating speed of said engine, (2) ratio control means operative to adjust the ratio of said transmission to substantially eliminate the difference between the existing value of said desired operating speed and the actual operating speed of said engine, and (3) throttle control means operative to open said throttle valve device to an effectively wide open position when the operating speed of said engine is both substantially equal to the existing value of said desired operating speed and equal to or greater than said minimum engine operating speed.

2. The apparatus of claim 1 further comprising means for eliminating said dilution of the air-fuel charge when said desired engine operating speed equals said maximum power engine speed, whereby the engine operator may select maximum power in preference to fuel economy.

3. The apparatus of claim 1 wherein said engine employs fast-burn design features which counteract the decreased expansion velocity component of flame speed in lean or otherwise diluted air-fuel mixtures.

4. The apparatus of claim 2 wherein said engine employs fast-burn design features which counteract the decreased expansion velocity component of flame speed in lean or otherewise diluted air-fuel mixtures.

5. The apparatus of claim 4 wherein said dilution of the air-fuel charge is in a proportion which substantially minimizes the brake specific fuel consumption of said engine at the existing operating speed of said engine and for the existing overall air-fuel ratio of said air-fuel charge together with said dilution; said minimum B.S.F.C. proportion existing throughout the wide open throttle range from said minimum engine operating speed to said maximum power engine operating speed.

6. The apparatus of claim 5 wherein said engine is a homogeneous charge gasoline engine.

7. The apparatus of claim 1 wherein said input means is further operative to select the desired value of brake power output from said engine and wherein said throttle control means is operative to adjust said throttle valve device to thereby substantially eliminate the difference between the existing value of said desired engine power output and the actual brake power output from said engine.

8. The apparatus of claim 2 wherein said input means is further operative to select the desired value of brake power output from said engine and wherein said throttle control means is operative to adjust said throttle valve device to thereby substantially eliminate the difference between the existing value of said desired engine power output and the actual brake power output from said engine.

9. The apparatus of claim 8 wherein said minimum engine operating speed is the minimum practical operating speed of said engine with said throttle valve device effectively wide open and with said air-fuel dilution being supplied to said engine.

10. The apparatus of claim 3 wherein said air-fuel charge dilution consists substantially of recirculated exhaust gas.

11. The apparatus of claim 3 wherein said dilution of the air-fuel charge is in a proportion which substantially minimizes the brake specific fuel consumption of said engine at the existing operating speed of said engine and for the existing overall air-fuel ratio of said air-fuel charge together with said dilution; said minimum B.S.F.C. proportion existing throughout the wide open throttle range from said minimum engine operating speed to said maximum power engine operating speed.

12. The apparatus of claim 11 wherein said air-fuel charge dilution consists substantially of recirculated exhaust gas.

13. The apparatus of claim 5 wherein said air-fuel charge dilution consists substantially of recirculated exhaust gas.

14. Apparatus for improving the efficiency with which power is delivered to a load by a naturally-aspirated Otto engine controlled by a throttle valve device and employing fast-burn design features which counteract the decreased expansion velocity component of flame speed in lean or otherwise diluted air-fuel mixtures, the apparatus comprising:

fuel metering means for automatically providing dilution of the air-fuel charge supplied to said engine when said throttle valve device is effectively wide open, said dilution being in a proportion which substantially minimizes the brake specific fuel consumption of said engine at the existing operating speed of said engine and for the existing overall air to fuel ratio of said air-fuel charge and said dilution, the major portion by weight of said dilution being recirculated exhaust gas and said minimum B.S.F.C. proportion existing from the minimum practical wide open throttle operating speed of said engine to the operating speed at which said engine develops maximum brake power, a continuously variable ratio transmission which transfers mechanical power from said engine to said load, said transmission having a range of ratios which allows torque values commonly imposed on said engine through said transmission to balance the brake torque output from said engine when the following conditions exist concurrently: (1) said throttle valve device is effectively wide open, (2) said fuel metering means is operative to provide said dilution of the air-fuel charge and (3) the power necessary to drive said load allows said engine to operate well below said maximum power crankshaft speed, whereby said transmission ratio range may often be used in preference to throttling for regulating the engine power output, input means for selecting the desired brake power output from said engine and for concurrently selecting the desired operating speed of said engine, said input means establishing an operating schedule for said engine by selecting a value of said desired brake power for each value concurrently selected by said input means from throughout a range of said desired engine operating speed, ratio control means operative to adjust the ratio of said transmission to thereby substantially eliminate difference between the value of said desired engine operating speed being selected by said input means and the actual operating speed of said engine, and throttle control means operative to adjust said throttle valve device to thereby substantially eliminate difference between the value of said desired brake power output being selected by said input means and the actual brake power output from said engine.

15. The apparatus of claim 14 further comprising means for eliminating said dilution of the air-fuel charge when said desired engine operating speed equals said maximum power engine speed, whereby the engine operator may select maximum power in preference to fuel economy.

16. The apparatus of claim 15 wherein said air-fuel charge dilution consists substantially of recirculated exhaust gas.

17. The apparatus of claim 11 wherein said engine is a homogeneous charge gasoline engine.

18. The apparatus of claim 7 wherein said minimum engine operating speed is the minimum practical operating speed of said engine with said throttle valve device effectively wide open and with said air-fuel dilution being supplied to said engine.

19. The apparatus of claim 3 wherein said minimum engine operating speed is the minimum practical operating speed of said engine with said throttle valve device effectively wide open and with said air-fuel dilution being supplied to said engine and wherein the flow of said air-fuel charge to said engine is unrestricted as well as unthrottled whenever said throttle valve device is effectively wide open.

20. The apparatus of claim 4 wherein said minimum engine operating speed is the minimum practical operating speed of said engine with said throttle valve device effectively wide open and with said air-fuel dilution being supplied to said engine and wherein the flow of said air-fuel charge to said engine is unrestricted as well as unthrottled whenever said throttle valve device is effectively wide open.

* * * * *